United States Patent [19]

Bodin

[11] 4,203,629
[45] May 20, 1980

[54] HYDRAULIC SERVO-BRAKE SYSTEM FOR ELECTRICALLY OPERATED VEHICLES

[76] Inventor: Ove Bodin, Box 54, 710 10 Fjugesta, Sweden

[21] Appl. No.: 926,198

[22] Filed: Jul. 19, 1978

[30] Foreign Application Priority Data

Aug. 1, 1977 [SE] Sweden ................. 7708751

[51] Int. Cl.² .......................................... B60T 13/16
[52] U.S. Cl. ........................... 303/10; 60/413; 60/547 R; 303/6 R
[58] Field of Search ............. 60/413, 418, 547, 581, 60/582, 585, 591; 303/6 R, 7, 10, 11, 12

[56] References Cited

U.S. PATENT DOCUMENTS

| 3,176,467 | 4/1965 | Van House | 303/6 R X |
| 3,719,044 | 3/1973 | Bach | 60/547 X |
| 3,747,987 | 7/1973 | Hendrickson | 303/10 X |
| 3,978,667 | 9/1976 | OHara | 60/413 X |
| 3,992,882 | 11/1976 | Bodin | 60/413 |
| 4,052,851 | 10/1977 | Brown | 60/582 X |

Primary Examiner—Douglas C. Butler
Attorney, Agent, or Firm—Burns, Doane, Swecker & Mathis

[57] ABSTRACT

A hydraulic servo-brake system for electrically driven vehicles, preferably trucks, having hydraulically driven working elements, such as lifting elements, tilting elements and the like, and having a control valve incorporated in a hydraulic supply-line system having a pump or arranged to cooperate with a pump, the supply-line system having a device arranged to accumulate control medium and a device for detecting the pressure in the supply-line system, the pressure-detecting device being arranged to cooperate with the pump in a manner such that the pump is activated when a given low-pressure value is sensed and is de-activated when a given high pressure value is sensed. The supply line system is connected, through a control valve, to a hydraulic cylinder having a piston, the hydraulic cylinder being connected to the master cylinder of the brake system, and which hydraulic cylinder is supplied with working medium from the supply-line system, the supply being in dependence upon the setting of the control valve, which setting is obtained by depression of a brake pedal. The return of the brake pedal from its depressed position to a free position permits the volume of working fluid enclosed in the hydraulic cylinder to pass to a reservoir via the control valve through a line. The piston rod of the piston of the hydraulic cylinder is arranged to actuate the piston rod of the piston of the master cylinder, end to end.

4 Claims, 2 Drawing Figures

HYDRAULIC SERVO-BRAKE SYSTEM FOR ELECTRICALLY OPERATED VEHICLES

FIELD OF THE PRESENT INVENTION

The present invention relates to a hydraulic servo-brake system for electrically driven vehicles, preferably a truck, having electrically operated working elements, such as lifting elements, tilting elements and the like, and having a control valve incorporated in a supply-line system provided with pump means or being arranged to co-act with pump means, said supply-line system having a device for accumulating working medium and a device for detecting the pressure in said supply-line system, said pressure detecting device being arranged to cooperate with the pump means in a manner such that, when a given low pressure valve is sensed the pump means will be activated, while when a given high pressure-value is sensed the pump means is deactivated.

BRIEF DESCRIPTION OF THE PRIOR ART

Electrically driven trucks of the aforementioned kind are known per se and previously there has been proposed with respect to such trucks solely the use of a normal hydraulic brake system, having a master cylinder capable of being actuated by means of a pedal, said cylinder being arranged to force oil to the working cylinders, via pipes, of the brake blocks adjacent respective wheels.

It will readily be perceived that with trucks of the aforementioned type, which may, for example, have a load capacity of six tons and which, when carrying a full load, have a total weight of approximately 14 tons, a normal braking system is not satisfactory, particularly in view of the fact that very high pressure must be exerted on to the pedal in order to obtain satisfactory braking. The pedal pressure required often exceeds that which can be exerted by the average person. When the wheels of such trucks have a small diameter, the brake drum will also have a small diameter, therewith limiting the braking capacity of the system.

It is known with trucks powered by conventional combustion engines to use a servo-brake system which operates with the vacuum generated by the engine. Thus, with this type of truck the braking problem has been solved in a satisfactory manner.

In the case of electrically driven vehicles, for example trucks, it has been proposed to use a particular vacuum pump in order thereby to create conditions in which a servo-brake system can be used. A vacuum pump, however, requires energy to be supplied thereto. The accumulators intended for these trucks are pre-dimensioned with small tolerances, and it has been found impossible in practice to connect and utilize a separate, continuously operating vacuum pump system.

OBJECTS OF THE PRESENT INVENTION

An object of the present invention is to provide a hydraulic servo-brake system which can only be used in such electrically driven vehicles, preferably trucks, as those having a hydraulically driven working element, such as lifting means, tilting means and the like, and which, to this end, is already provided with oil-pressurizing means.

The present invention, however, can only be used advantageously in those trucks which also have a hydraulic supply-line system with a regulating valve incorporated therein, said supply-line system being provided with pump means or arranged to cooperate with such means, and said control valve being preferably arranged to regulate control means. The supply-line system exhibits a device for accumulating the working medium and means for detecting the pressure in the supply-line system, the pressure detecting device being arranged to so cooperate with the pump means that said pump means is activated when a given low pressure value is detected and is deactivated when a given high pressure value is detected. The device accumulating the working medium ensures that there is always present in the truck a control medium of sufficiently high pressure, namely exceeding the low pressure value at which the pump means is activated, to thereby increase the pressure.

The control medium is not utilized in accordance with the invention solely to control the extent to which the wheels of the truck are turned, but also to create a servo-brake system.

By creating the possibility of a servo-brake system for this type of truck, it is possible to effectively brake a heavily loaded truck, with a light pressure on the brake pedal. This is of particular importance when the trucks are being driven by female drivers, who have found it difficult with previously known braking systems to apply sufficient pressure to the brake pedal.

BRIEF DESCRIPTION OF THE ACCOMPANYING DRAWINGS

A proposed hydraulic servo-brake system intended for electrically driven vehicles, preferably electrically driven trucks having hydraulically operated working elements, such as liftning elements, tilt elements and the like and having a control valve incorporated in an hydraulic supply line system provided with a pump means or arranged to cooperated with a pump means, said supply-line system having a device for accumulating control medium and a device for sensing the pressure in the supply-line system, the pressure-sensing device being arranged to cooperate with the pump means in a manner such that when a given low pressure-value in sensed the pump means is activated while when a given high-pressure value is sensed the pump means is deactivated, will be described hereinafter with reference to the accompanying drawing, in which FIG. 1 illustrates a hydraulic coupling diagram on the arrangement incorporated in a vehicle and FIG. 2 illustrates schematically the hydraulic servo-brake system coupled to the hydraulic coupling diagram accordingto FIG. 1.

DESCRIPTION OF A PREFERRED EMBODIMENT

The present invention relates to a hydraulic servo-brake system which can be used in vehicle, for example a truck, having electrically operated drive means, hydraulically or pneumatically driven control means and hydraulically or pneumatically driven working elements, such as lifting elements, tilting elements and the like. Since the present invention is not directly related to the supply of curren to the electrically driven means or the arrangement of electrical accumulators, these elements have not been shown in FIG. 1 for the sake of clarity.

It will be understood that the inventio may utilize pneumatically driven devices as well as hydraulically driven devices, although the invention will be exemplified in the following description with reference to a hydraulically driven system.

Figure 1:
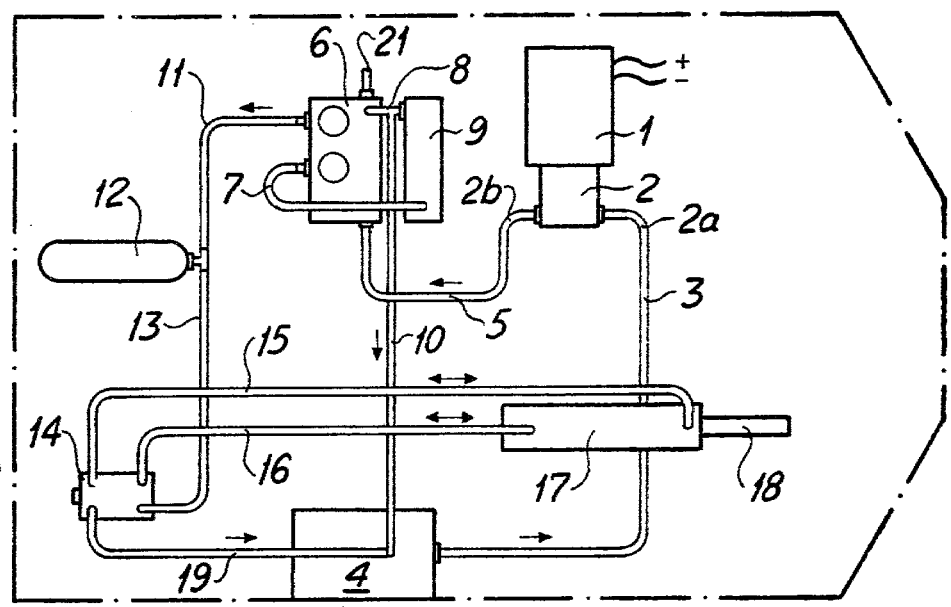

Referring to FIG. 1, the preferred embodiment of the invention an electric motor 1 arranged to drive a hydraulic pump 2, the input port 2a of which is connected to a tank 4 for supplying working medium such as hydraulic fluid, via a line 3. The output port 2b of the pump is coupled, via a line 5, to a flow divider 6 for distributing a control medium. Connected to the distributing device 6 are inter alia, two lines 7 and 8. The line 7 is connected to a valve 9 by means of which control medium is passed to a working cylinder (not shown) associated with the working element. The line 8 is a return line and extends between the fluid distributing device 6 and the valve 9. The distributing device 6 and the valves are connected, via the line 8, with a line 10 serving as the actual line to the tank 4. The distributing device 6 also exhibits a connecting means for a pipe 11 forming part of the supply-line system serving the control means. The line 11 cooperates with a device 12 for accumulating the contrl medium, said device being connected, via a line 13, with a control valve associated with the actual control means. The control valve is referenced 14 and can be a valve sold under the trade name "ORBITOL" DSP-160. The valve is thus regulatable and the magnitude of wheel turn is determined thereby. The valve 14 is also arranged so that, when in a neutral position, i.e. when the wheels are set for driving in a straight line the passage of control medium through the control valve 14 is blocked. This means that provided the driving wheel is not turned, the passage through the control valve 14 is blocked. This means that the device 6 has a construction such that pressure can build up upstream of the valve 14. Lines 15 and 16 extend from the control valve 14 to the control cylinder 17 incorporated in the hydraulic system on the control arrangement, and the piston 18 in the control cyliner 17 is arranged to actuate linkages (not shown in the Figure) for setting the extent to which the wheels are turned. A line 19 extends from the control valve 14 to the medium tank 4. Oil passed back from the control cylinder 17 passes through the valve 14 to the medium tank 4 via the line 9.

As will be seen from FIG. 1, the same hydraulic pump 2 serves both the control means and the working element.

A more detailed description of the components of the hydraulic coupling diagram is found in the U.S. Pat. No. 3,992,882, granted 23rd Nov. 1976.

Figure 2:
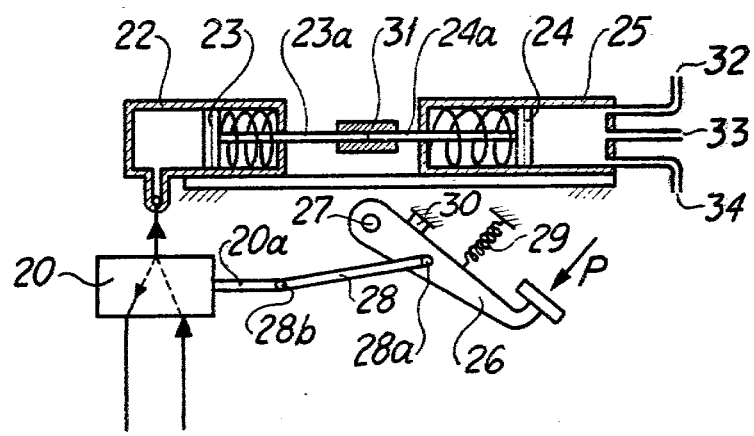

As will best be seen from FIG. 2, the present invention is characterized in that connected to the supply line system 11, 12, 13 i FIG. 1, via a control valve 20, is a hydraulic cylinder 22 whose piston 23 with associated piston rod 23a is arranged to cooperate with the piston rod 24a of a piston 24 of a main cylinder 25 for the normal brake system. The master cylinder 22 is supplied with control medium from the supply-line system via the line 13 in dependence upon the setting of the control valve 20. The setting of the control valve 20 is obtained by depressing a brake pedal. The brake pedal is referenced 26 in FIG. 2.

The brake pedal 26 is pivotally connected by a shaft 27 to a holder means and via a linek 28, whose one end 28a is pivotally connected to the pedal 26 and the other end 28b is pivotally connected to the actuating means 20a of the control valve 20, the rotary position of the pedal 26 or the depressing thereof with a force "P" will be transmitted directly to the control valve 20. The pedal 26 is brought to its starting position against a stop 30 by means of a spring 29.

The return of the brake pedal from its depressed position to its starting position (the position illustrated in FIG. 2) permits the volume of working medium in the hydraulic cylinder 20 to pass to the tank 4, via the control valve 20, or into the line 19.

As will be seen from FIG. 2, the piston rod 23a of the piston associated with said hydraulic cylinder is permitted to actuate the piston rod 24a of the piston of the master cylinder, end to end, and at these ends are connected together through a bushing 31. It will also be seen that the setting position of the control valve is directly dependent upon depression of the brake pedal, through the link 28.

Thus, FIG. 2 illustrates the master cylinder 25 with the associated piston 24 and a plurality of lines 32, 33 and 34. These lines are connected to working cylinders mounted adjacent the brake bands on respective wheels. Since these elements do not comprise part of the present invention, they will not be described in detail.

The system of supply lines also incorporate a device 21 arranged to detect the pressure prevailing in the supply-line system, said device 21 being located within the distributing device 6. The device 21 is described in more details in the aforementioned US Patent Specification.

The spring in the master cylinder 25 is a tension spring, while the spring in the hydraulic cylinder 22 is a pressure spring, the two springs cooperating to return the system to its starting position, (illustrated in FIG. 2). It will also be seen from FIG. 2 that the hydraulic cylinder 25 and the hydraulic cylinder 22 are mounted on one and the same plate. The present invention can be mounted very simply, since the arm between the brake pedal and the master cylinder is removed and replaced by a hydraulic cylinder 22, control valve 20 and links 28.

Although the control valve 20 has not been illustrated in detail it will be understood that it comprises a valve so constructed that, in dependence upon the withdrawn or extended position of the actuating means 28, more and more hydraulic oil is delivered under pressure to the cylinder 22 the more the actuating device 20a is withdrawn, resulting in an increasing force on the piston rod 24a.

The inventio is not restriced to the exemplary embodiments, but can be modified within the scope of the following claims.

It should be noted that the spring in the cylinder 22 may be arranged on the other side of the piston 23 and the inlet from valve 20 may be arranged on the other side of the piston. Such an arrangement has the benefit that a decrease in the pressure in line 13 automatically brakes the truck. In this application the valve 20 must be constructed to supply full pressure to cylinder 22 when the brake is deactivated and release the pressure in the cylinder 22 gradually when the brake pedal is activated.

What is claimed is:

1. A hydraulic servo-brake system for an electrically driven vehicle, the vehicle including an hydraulically operated working element and having an hydraulic control system comprising:
pump means for providing a hydraulic medium under pressure;
an hydraulic supply line system for supplying pressurized medium from said pump means to at least one hydraulically operated mechanism in the vehicle;

a regulator valve for regulating the flow of hydraulic medium to the hydraulically operated mechanism;

means for accumulating at least some of the hydraulic medium in said hydraulic supply line system; and means for detecting the pressure of the medium in said supply line system and for controlling the operation of said pump means such that said pump means is actuated when a predetermined low-pressure value is detected in said supply line system and said pump means is deactuated when a predetermined high-pressure value is detected in said supply line system;

said hydraulic servo-brake system comprising:

an hydraulic cylinder;

a piston disposed within said cylinder and connected to the master cylinder of a brake system for the vehicle;

means for supplying pressurized hydraulic medium from said hydraulic supply line system to said hydraulic cylinder;

a control valve for controlling the volume of hydraulic medium supplied from said hydraulic supply line system to said hydraulic cylinder; and a brake pedal for operating said control valve, said control valve being responsive to the position of said brake pedal such that the volume of hydraulic medium supplied to said hydraulic cylinder is proportional to the amount of depression of said pedal from a rest position, to thereby control the pressure of medium in said hydraulic cylinder in dependence upon the position of said brake pedal.

2. A brake system according to claim 1, characterised in that return of the brake pedal from its depressed position to a free position permits the volume of working fluid enclosed in the hydraulic cylinder to pass to a reservoir via the control valve through a line.

3. A brake system according to claim 1, characterised in that the piston rod of the piston of the hydraulic cylinder is arranged to actuate the piston rod of the piston of the master cylinder, end to end.

4. A brake system according to claim 1, characterised in that the setting of the control valve is directly dependent upon depression of the brake pedal through a link.

* * * * *